(12) United States Patent
Zheng et al.

(10) Patent No.: US 10,277,548 B2
(45) Date of Patent: Apr. 30, 2019

(54) METHOD AND DEVICE FOR PROMPTING DYNAMIC INFORMATION ABOUT CONTACT PERSON

(71) Applicant: Tencent Technology (Shenzhen) Company Limited, Shenzhen (CN)

(72) Inventors: Zhihao Zheng, Shenzhen (CN); Hao Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/430,160

(22) Filed: Feb. 10, 2017

(65) Prior Publication Data

US 2017/0155609 A1    Jun. 1, 2017

Related U.S. Application Data

(63) Continuation of application No. 14/349,255, filed as application No. PCT/CN2012/087621 on Dec. 27, 2012, now abandoned.

(30) Foreign Application Priority Data

Dec. 27, 2011    (CN) .......................... 2011 1 0444059

(51) Int. Cl.
*H04L 12/24* (2006.01)
*H04L 12/58* (2006.01)
(Continued)

(52) U.S. Cl.
CPC .............. *H04L 51/18* (2013.01); *G06Q 10/10* (2013.01); *H04L 12/1827* (2013.01);
(Continued)

(58) Field of Classification Search
CPC ......... H04L 12/26; H04L 29/08; H04L 29/06; H04L 43/08; H04L 63/10; H04L 67/10
(Continued)

(56) References Cited

U.S. PATENT DOCUMENTS

2007/0061405 A1* 3/2007 Keohane .............. G06Q 10/109
                                                              709/207
2008/0147803 A1* 6/2008 Krzyzanowski ...... H04L 51/043
                                                              709/206

(Continued)

FOREIGN PATENT DOCUMENTS

CN         101150542 A      3/2008
CN         101197790 A      6/2008
(Continued)

OTHER PUBLICATIONS

OA issued in Corresponding KR 10-2014-7007945 mailed on Mar. 25, 2015, with a concise English explanation of Relevance for KR OA1.

(Continued)

*Primary Examiner* — Ario Etienne
*Assistant Examiner* — Elizabeth Kassa
(74) *Attorney, Agent, or Firm* — Morgan, Lewis & Bockius LLP

(57) ABSTRACT

Disclosed is a method for prompting dynamic information about a contact person. The method comprises: obtaining dynamic information about a contact person of a user; and displaying the dynamic information about the contact person in an instant messaging chat window of the user. Also disclosed is a device for prompting dynamic information about a contact person. After applying the method, the dynamic updated information about a contact person can be displayed in an instant messaging chat window of a user. Thus, when chatting with the contact person, the user can see (Continued)

a message about dynamic updated information about the contact person in the interactive chatting mode promptly. The user can obtain information and filter information more conveniently and with a shorter delay, thereby facilitating good communication between the user and the contact person and improving the user experience.

16 Claims, 5 Drawing Sheets

(51) Int. Cl.
*H04L 12/18* (2006.01)
*G06Q 10/10* (2012.01)
*H04L 29/08* (2006.01)
*H04L 29/06* (2006.01)

(52) U.S. Cl.
CPC .............. *H04L 51/04* (2013.01); *H04L 51/08* (2013.01); *H04L 67/20* (2013.01); *H04L 67/42* (2013.01); *H04L 51/22* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 2008/0235367 A1* | 9/2008 | Niemeyer | ............... | H04L 51/04 709/224 |
| 2009/0006550 A1* | 1/2009 | Singh | ..................... | G06Q 30/02 709/204 |
| 2010/0146054 A1* | 6/2010 | Armstrong | ........ | G06F 17/30867 709/205 |
| 2011/0154223 A1* | 6/2011 | Whitnah | ................. | H04L 51/32 715/753 |
| 2011/0307355 A1* | 12/2011 | Khalil | .................... | G06Q 30/06 705/27.1 |
| 2012/0054288 A1* | 3/2012 | Wiese | .................... | G06Q 10/10 709/206 |

FOREIGN PATENT DOCUMENTS

| | | |
|---|---|---|
| CN | 101483537 A | 7/2009 |
| JP | 2007318715 A | 12/2007 |
| JP | 2009230725 A | 10/2009 |

OTHER PUBLICATIONS

OA issued in Corresponding JP 2014-532242 mailed on Dec. 16, 2014, with a concise English explanation of relevance for JP OA1.
Decision of Refusal OA issued in corresponding JP OA 2014-532242 dated Mar. 31, 2015, with a concise English Explanation of relevance for JP OA2.
Tencent Technology, ISRWO, PCT/CN2012/087621, Mar. 28, 2013, 9 pgs.
Tencent Technology, IPRP, PCT/CN2012/087621, Jul. 1, 2014, 8 pgs.

* cited by examiner

101

Obtaining dynamic information about a contact person of a user

102

Displaying the dynamic information about the contact person in an instant messaging chat window of a device of the user

METHOD AND DEVICE FOR PROMPTING DYNAMIC INFORMATION ABOUT CONTACT PERSON

CROSS REFERENCE TO RELATED APPLICATIONS

This application is a continuation application of U.S. patent application Ser. No. 14/349,255, entitled "METHOD AND DEVICE FOR PROMPTING DYNAMIC INFORMATION ABOUT CONTACT PERSON", filed on Apr. 2, 2014, which is a 371 of PCT/CN2012/087621, entitled "METHOD AND DEVICE FOR PROMPTING DYNAMIC INFORMATION ABOUT CONTACT PERSON", filed Dec. 27, 2012, which claims priority to Chinese Patent Application No. 201110444059.6, filed on Dec. 27, 2011 and entitled "METHOD AND DEVICE FOR PROMPTING DYNAMIC INFORMATION ABOUT CONTACT PERSON", the contents of which are hereby incorporated by reference in their entirety.

FIELD OF THE TECHNICAL

The present disclosure relates to internet application technology fields, more specifically, to a method and device for prompting dynamic information about a contact person.

BACKGROUND

The section provides background information related to the present disclosure which is not necessarily prior art.

With the rapid development of computer technology and network technology, a role of the internet played in people's daily life, study and work is also growing. Especially, instant messaging (IM) is a major application of the internet.

Instant messaging has an ability of sending and receiving instant messages and other internet businesses. Since its launch in 1998, functions of the instant messaging are increasing and gradually integrate several functions such as e-mail, blog, music, television, games and search. The IM is no longer a simple chat tool; it has developed into an integrated information platform for communication, information, entertainment, search, e-commerce, office collaboration and enterprise customer service. The IM is a set of communication technologies used for text-based communication between two or more participants over the internet or other types of networks. Most instant messaging services provide characteristics of status information—displaying contact person list, whether contact persons being online, and whether contact persons being communicated, and so on.

With the current increasing diversity and comprehensive development of network applications, people often need to know the status of the update information of the IM contact persons. For example, if a contact person of a user A posts a new blog, participates in a test or votes, and uploads images in space of the user A, the first time the user A looks forward to the status of the update information.

However, the currently instant messaging tools fail to display the statues of the updated information of contact persons timely. It needs user finds the status of the updated information of the user's contact persons actively. For example, suppose that the user's contact person updates information in space of the contact person, in the related art, if the user wants to know the updated information, the user need to go the space of the contact person. Therefore, in the existing interactive mode, the user can not follow the dynamic information of the user's contact persons, which is not good for communicating with contact persons.

SUMMARY

The disclosed a system and system for processing location data of a target user are directed to solve one or more problems set forth above and other problems.

This section provides a general summary of the disclosure, and is not a comprehensive disclosure of its full scope or all of its features.

Further regions of applicability will become apparent from the description provided herein. The description and specific examples in this summary are intended for purposes of illustration only and are not intended to limit the scope of the present disclosure.

A method for prompting dynamic information about a contact person, comprising: obtaining dynamic information about a contact person of a user; displaying the dynamic information about the contact person in an instant messaging chat window of a device of the user.

A device for prompting dynamic information about a contact person, comprising: an obtaining unit configured to obtain dynamic information about a contact person of a user; a display unit configured to display the dynamic information about the contact person in an instant messaging chat window of a device of the user.

A non-transitory computer readable storage medium, storing one or more programs for execution by one or more processors of a computer having a display, the one or more programs comprising instructions for: obtaining dynamic information about a contact person of a user; displaying the dynamic information about the contact person in an instant messaging chat window of a device of the user.

BRIEF DESCRIPTION OF THE DRAWINGS

In order to illustrate the embodiments or existing technical solutions more clearly, a brief description of drawings that assists the description of embodiments of the disclosure or existing art will be provided below. It would be apparent that the drawings in the following description are only for some of the embodiments of the disclosure. A person having ordinary skills in the art will be able to obtain other drawings on the basis of these drawings without paying any creative work.

DETAILED DESCRIPTION OF ILLUSTRATED EMBODIMENTS

Figures 1A, 1B:
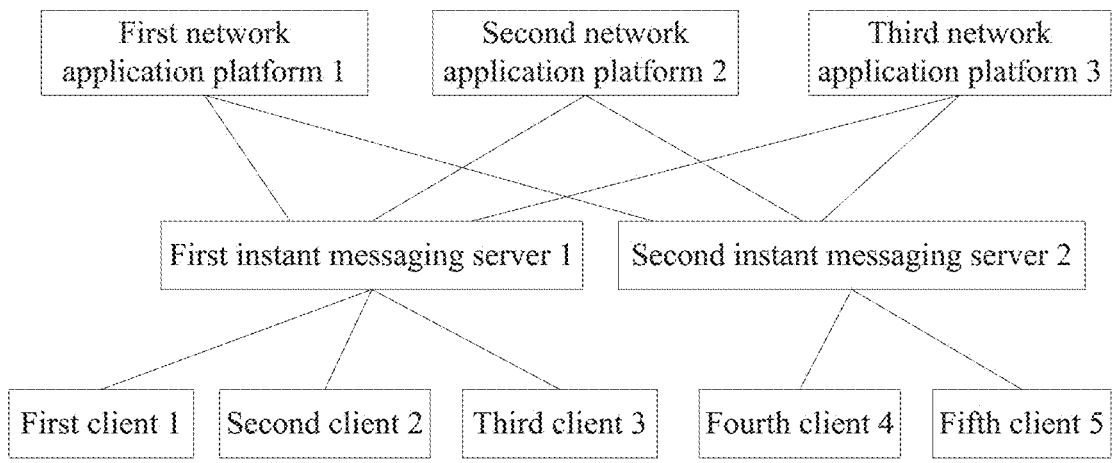
FIG. 1A is a flowchart of an example of a method for prompting dynamic information about a contact person according to various embodiments.
FIG. 1B is a structure diagram of an example of a system for prompting dynamic information about a contact person according to various embodiments.

Technical solutions in embodiments of the present disclosure will be illustrated clearly and entirely with the aid of the drawings in the embodiments of the disclosure. It is apparent that the illustrated embodiments are only some embodiments of the disclosure instead of all of them. Other embodiments that a person having ordinary skills in the art obtains based on the illustrated embodiments of the disclosure without paying any creative work should all be within the protection scope sought by the present disclosure.

Referring to FIG. 1, it is a flowchart of an example of a method for prompting dynamic information about a contact person according to various embodiments. The method includes the following steps.

Step S101: obtaining dynamic information about a contact person of a user.

In the embodiment, the dynamic information of the contact persons can be obtained from multiple network application platforms.

Specifically, in one embodiment, the dynamic information about the contact person can be obtained from network personal space supplied by the contact persons of the user. The dynamic information about the contact person may be space dynamic information, such as a new blog posted by contact persons of the user, a test or vote participated in by the contact persons of the user, or images uploaded by the contact persons of the user in the network personal space. For example, when an instant messaging tool is an instant messaging tool of TENCENT, the network personal space may be a QQ space.

In one embodiment, the dynamic information about the contact person can be obtained from a micro-blog space of the contact persons of the user. The dynamic information about the contact person may be micro-blog dynamic information, such as a new blog posted by contact persons of the user, a test or vote participated in by the contact persons of the user, or images uploaded by the contact persons of the user in the micro-blog space. For example, when an instant messaging tool is an instant messaging tool of TENCENT, the micro-blog space may be a QQ micro-blog.

In one embodiment, the dynamic information about the contact person can be obtained from a blog space of the contact persons of the user. The dynamic information about the contact person may be blog dynamic information, such as a new blog posted by contact persons of the user, a test or vote participated in by the contact persons of the user, or images uploaded by the contact persons of the user in the blog space. For example, when an instant messaging tool is an instant messaging tool of TENCENT, the blog space may be a QQ blog.

In one embodiment, the dynamic information about the contact person can be obtained from an online game platform of the contact persons of the user. The dynamic information about the contact person may be online game dynamic information, such as a new blog posted by contact persons of the user, a test or vote participated in by the contact persons of the user, or images uploaded by the contact persons of the user in the online game platform. For example, when an instant messaging tool is an instant messaging tool of TENCENT, the online game platform may be QQ games.

In one embodiment, the dynamic information about the contact person can be obtained from an online trading platform of the contact persons of the user. The dynamic information about the contact person may be online trading dynamic information, such as a new blog posted by contact persons of the user, a test or vote participated in by the contact persons of the user, or images uploaded by the contact persons of the user in the online trading platform. For example, when an instant messaging tool is an instant messaging tool of TENCENT, the online trading platform may be QQ Pat.

The dynamic information about the contact person may include a count number of information updated dynamically by the contact persons of the user, and/or description information for describing the information updated dynamically by the contracts of the user in summary form. For example, suppose that a contact person updates fifteen messages in the network personal space. The count number of dynamic information about the contact person is fifteen. In addition, suppose that a contact person of the user posts a series of blogs in the network personal space, and release some sharing sites, the dynamic information about the contact person may be the last dynamic information described in summary form, so as to facilitate the subsequent presentation to the user.

The obtained dynamic information about the contact person also may include the whole or part of the information updated dynamically by contact persons, and/or updated information of contact persons' friends in a group which the contact persons belongs to.

Specifically, the dynamic information about the contact person can be obtained from various network application platforms through multiple ways. For example, when the dynamic information about the contact person in the network application platforms is updated, the corresponding network application platform actively supplies the updated dynamic information about the contact person to an instant messaging server of the user. Or the instant messaging server of the user sends a requirement to the network application platforms to query whether the dynamic information about the contact person in the corresponding network application platform is updated. If the corresponding network application platform receives the requirement, and the corresponding dynamic information about the contact person is updated, the corresponding network application platform sends the updated dynamic information about the contact person to the instant messaging server of the user. Referring to FIG. 1B, a first instant messaging server 1 obtains dynamic information about the contact person of a first client 1, a second client 2, and a third client 3 from a first network application platform 1, a second network application platform 2, and a third network application platform 3. A second instant messaging server 2 obtains dynamic information about the contact person of a fourth client 4 and a fifth client 5 from the first network application platform 1, the second network application platform 2, and the third network application platform 3.

The above descriptions only some dynamic information about the contact person suppler. A person having ordinary skills in the art can realize that part or whole of the embodiment only is configured to express an aim, and should not be regarded as limitation to the embodiment of the disclosure.

Step 102: displaying the obtained dynamic information about the contact person in a chat window of the instant messaging tool of a device of the user.

The instant messaging chat window is supplied by an instant messaging client. The instant messaging chat window is located in a computing device with a displaying function. Before displaying the dynamic information about the contact person, the instant messaging server supplies the obtained dynamic information about the contact person to the client of the user. For example, the instant messaging server can actively supply the dynamic information about the contact person to the client of the user. Or the client of the user sends a requirement to the instant messaging server to query whether the instant messaging server obtains the updated dynamic information about the contact person. If the instant messaging server receives the requirement, and obtained the updated dynamic information about the contact person is updated, the instant messaging server sends the updated dynamic information about the contact person to the client of the user. Referring to FIG. 1B, a first client 1, a second client 2, and a third client 3 obtains the dynamic information about the contact person of an instant messaging server 1, and display the obtained dynamic information about the contact person on the instant messaging chat window of the user. A fourth client 4 and a fifth client 5 obtain the dynamic information about the contact person form a second instant messaging server 2, and display the obtained dynamic information about the contact person on the instant messaging chat window of the device of the user.

It should be noted that a structure diagram of a system shown in FIG. 1B only describes a relationship among the network application platforms, the instant messaging servers, and the clients. A person having ordinary skills in the art can understand the function entities of the embodiment may be located in the same physical hardware, or located in different physical hardware.

Preferably, the obtained dynamic information about the contact person may be displayed on a top or a summary area of the instant messaging chat window. The obtained dynamic information about the contact person also may be displayed on other areas designated by the user of the instant messaging chat window.

More preferably, the count number of information dynamically updated by the contact persons during a period of the time from the last chat to a current chat is displayed on the top of the instant messaging chat window. And/or the count number of the information dynamically updated by the contact persons during a period of the time from the last chat to the current chat, and described in summary form, is displayed in the summary area of the instant messaging chat window.

The embodiment can apply various chat windows of the instant messing tool, such as a single chat dialog box of the instant messaging tool, a group chat dialog box of the instant messaging tool, a chat dialog box of the mobile instant messaging tool, and a chat contact person list of the mobile instant messaging tool. The single chat dialog box of the instant messaging tool may be a chat window for chatting.

Thus, the embodiment displays the information dynamically updated by the contact persons in the instant messaging chat window. When the user chats with the contact persons, the user can see the information dynamically updated by the contact persons from the chat interactive mode in time (such as prompting the dynamic updated information in summary form). Therefore, the user can obtain information and filter information more conveniently and with a shorter delay, thereby facilitating good communication between the user and the contact person and improving the user experience.

The embodiment will be described more specifically combined with the following schematic diagrams.

Figure 2:
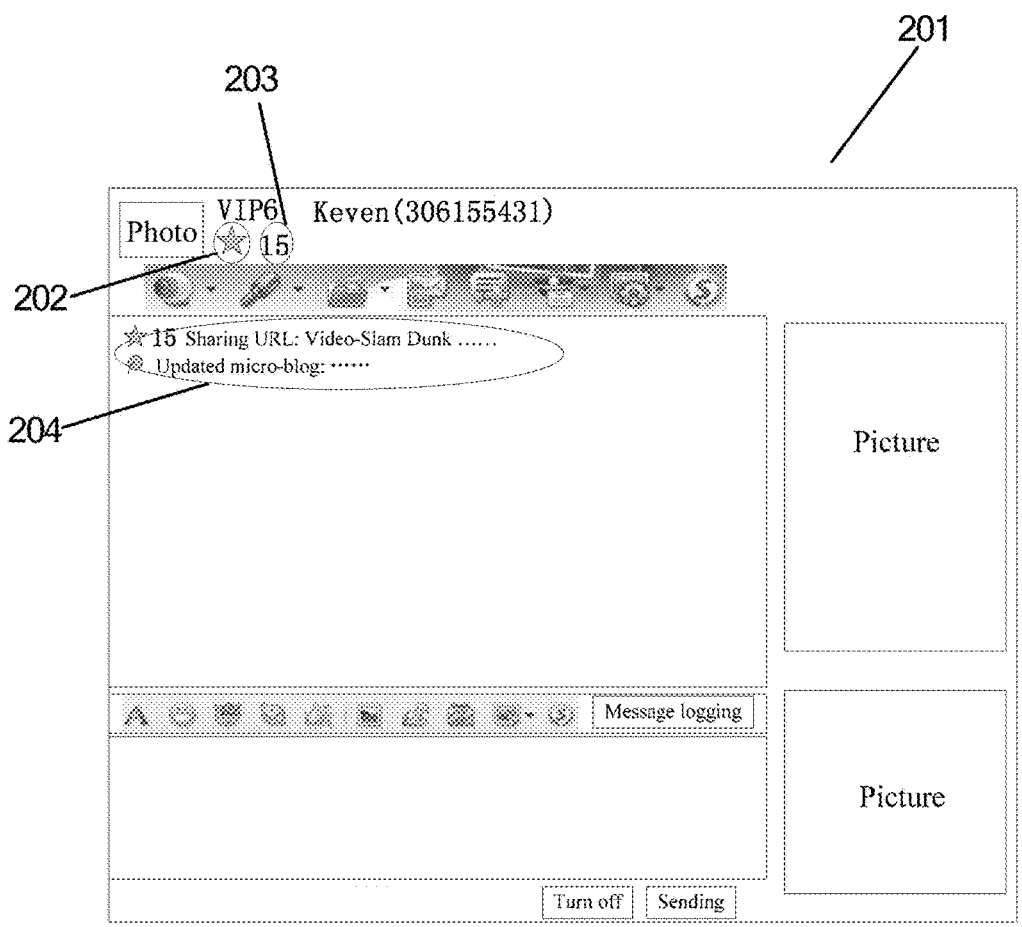
FIG. 2 is a schematic diagram of an interface of an instant messaging tool in a chat interactive mode, the interface shows updated dynamic information about a contact person.

FIG. 2 is a schematic diagram of an interface of an instant messaging tool in a chat interactive mode. The interface shows updated dynamic information about the contact person.

In FIG. 2, when the dynamic information about the contact person is updated, the top and summary area of the chat window both display the information dynamically updated by the contact person during twice chats. It can be seen through FIG. 2, there are a logo 202 of the personal space and the number (number 15) 203 of the updated information dynamically below the logo "VIP6", to prompt the user there are fifteen messages in the personal space of the contact person. In addition, it can be seen that a summary of the chat window in the summary area, suggesting a dynamical updated summary information 204, "sharing URL: Video-Slam Dunk . . . ." The information in summary form prompts the user that it is the latest one specific information dynamically updated by the contact person in the personal space of the contact person.

Figure 3:
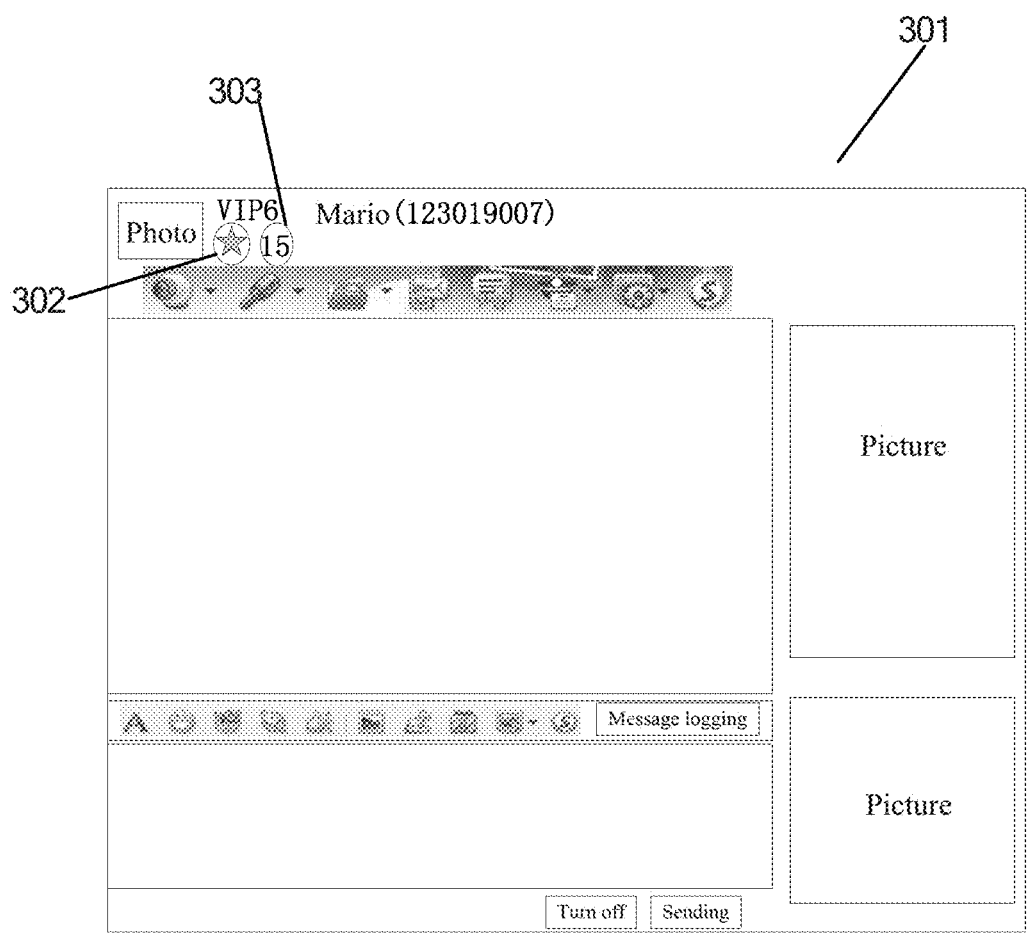
FIG. 3 is a schematic diagram of an interface of an instant messaging tool in a chat interactive mode, some of the dynamic information about a contact person shown in the interface fails to be updated.

Referring to FIG. 3, it is a schematic diagram of an interface of an instant messaging tool in a chat interactive mode, some of the dynamic information about the contact person shown in the interface fails to be updated.

When the contact person fails to update information, the summary area of the chat window displays nothing, while the dynamic information of the personal space of the contact persons still appears on the top of the chat window. That is, there are a logo 302 of the personal space and the number (number 15) 303 of the updated information dynamically below the logo "VIP6", to prompt the user there are fifteen messages in the personal space of the contact person.

Figure 4:
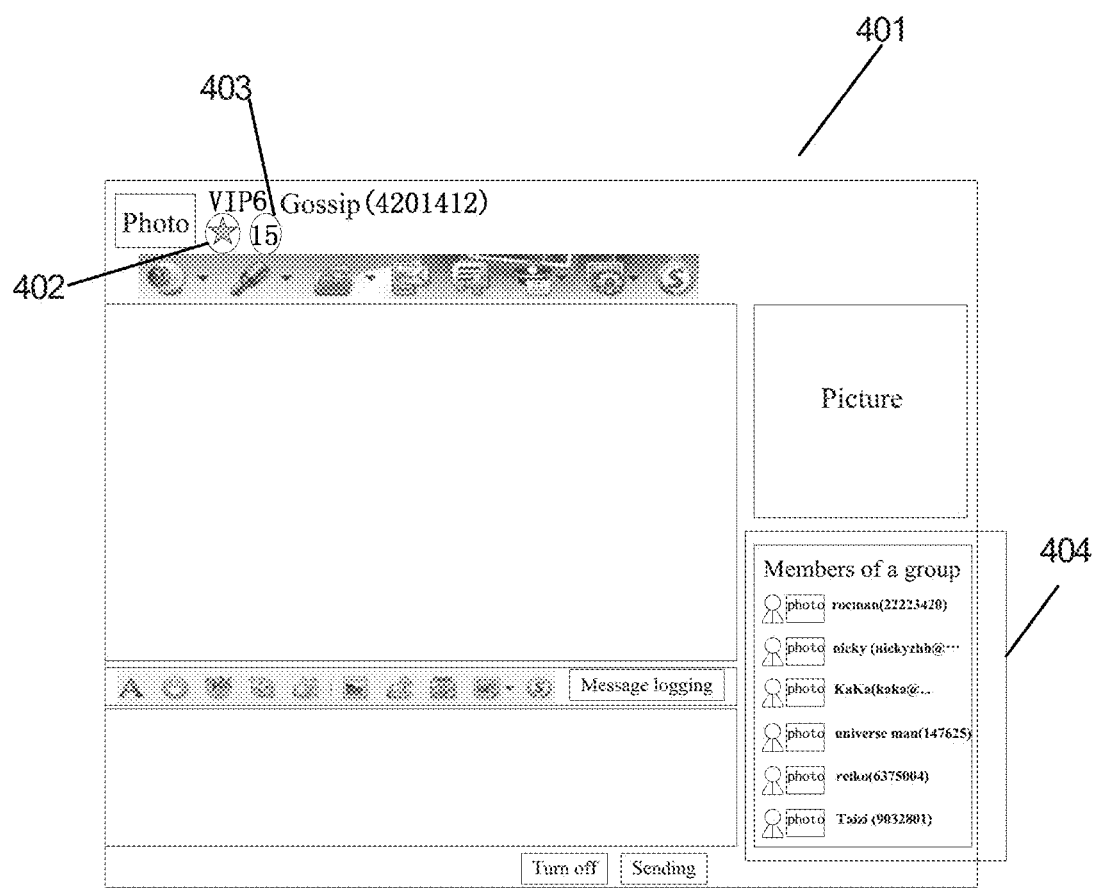
FIG. 4 is a schematic diagram of an interface of an instant messaging tool in a chat group interactive mode, some of the dynamic information about a contact person shown in the interface fails to be updated.

Referring to FIG. 4, it is a schematic diagram of an interface of an instant messaging tool in a chat group interactive mode, some of the dynamic information about the contact person shown in the interface fails to be updated.

A log 402 of the personal space of the contact person is located on a top of the group chat window and below a log "VIP6". The top of the group chat window displays there are fifteen dynamic updated messages in the group space. A summary area of the group chat window fails to display a summary in the group chat window. At that time, the group chat window display the information 404 dynamically updated by group friends during twice opening the group chat window.

Figure 5:
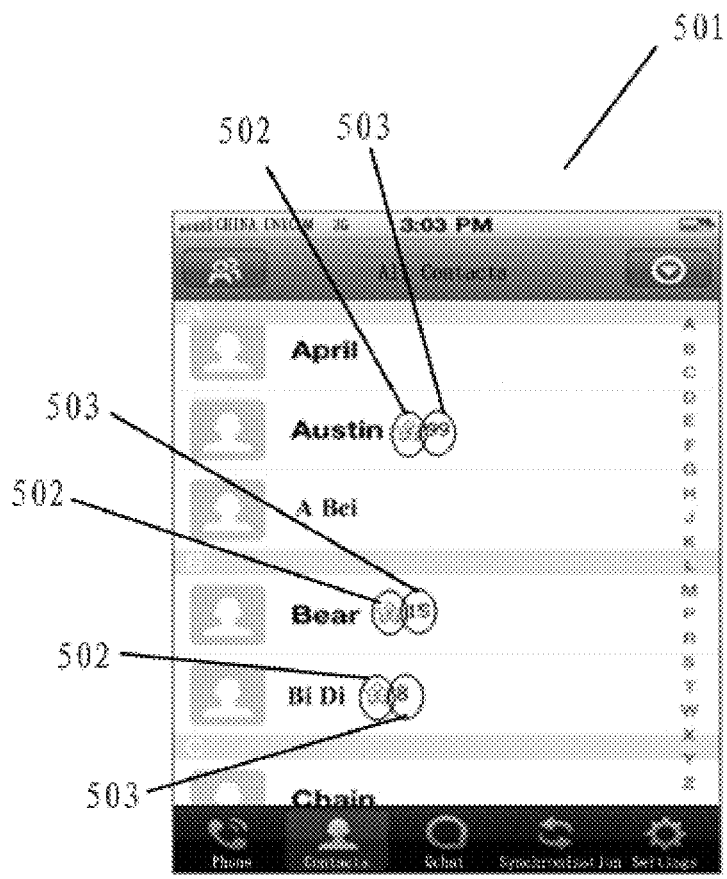
FIG. 5 is a schematic diagram of an interface of an instant messaging tool of a mobile terminal in a chat interactive mode, the interface shows updated dynamic information about a contact person.

Referring to FIG. 5, it is a schematic diagram of an interface of an instant messaging tool of a mobile terminal in a chat interactive mode, the interface shows updated dynamic information about the contact person.

In a chat contact person list of a mobile instant messaging tool in an interactive mode, a personal space logo 502 is displayed on the right of a user's name Austin. A right of the personal space logo 502 displays the number 503 of the information dynamically updated by the user is ninety-nine. The personal space logo 502 is displayed on the right of a user's name Bear. A right of the personal space logo 502 displays the number 503 of the information dynamically updated by the user is fifteen. The personal space logo 502 is displayed on the right of a user's name Di Bi. A right of the personal space logo 502 displays the number 503 of the information dynamically updated by the user is eight. However, the chat contact person list 501 of the mobile instant messaging tool fails to display the corresponding summary.

Based on the above analysis, the embodiments also provide a device for prompting dynamic information about the contact person.

Figure 6:
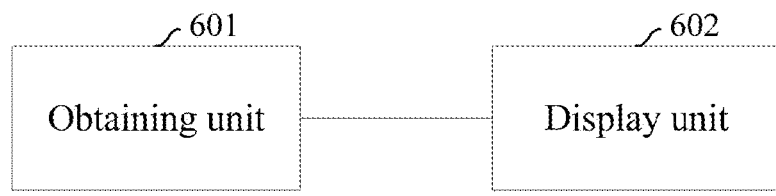
FIG. 6 is a block diagram of an example of a device for prompting dynamic information about a contact person according to various embodiments.

Referring to FIG. 6, it is a block diagram of an example of a device for prompting dynamic information about the contact person according to various embodiments. The device includes an obtaining unit 601 and a display unit 602.

The obtaining unit 601 is configured to obtaining dynamic information about the contact person of a user.

The display unit 602 is configured to display the obtained dynamic information about the contact person obtained in an instant messaging chat window of the device of the user.

In the embodiment, the display unit 602 is also configured to display the obtained dynamic information about the contact person on a top or a summary area of the instant messaging chat window.

In other embodiments, the display unit 602 is also configured to display the count number of information dynamically updated by the contact persons during a period of the time from the last chat to the current chat on the top of the instant messaging chat window. And/or the display unit 602 is also configured to display the count number of information dynamically updated by the contact persons during a period of the time from the last chat to the current chat, and described in summary form, is displayed in the summary area of the instant messaging chat window.

The obtaining unit 601 may be located in computing equipments, such as network server equipments, network equipments, personal computers used by instant messaging users, and intelligent terminals. The display unit 602 may be located in the computer equipments, such as the personal computers used by instant messaging users, and the intelligent terminals.

The whole or part of the device is located in the instant messaging clients. For example, the display unit 602 is located in an instant messaging client. The obtaining unit 601 is located in an instant messaging server. The obtaining unit 601 sends the dynamic information about the contact person to the instant messaging client. The display unit 602 of the instant messaging client displays the dynamic information about the contact person. As another example, the obtaining unit 601 and the display unit 602 are located in the instant messaging client. The obtaining unit 601 obtains the dynamic information about the contact person from the instant messaging server, and sends the dynamic information about the contact person to the display unit 602, to make the display unit 602 display the dynamic information about the contact person.

By the above described example, a person having ordinary skills in the art can clearly understand how to achieve the above embodiments by means of software plus necessary universal hardware platforms. The above embodiments can be implemented by hardware, but in many cases the former is a better. Based on such understanding, the technical nature of the above embodiments or the part of the above embodiments different from the prior art may be embodied in the form of a software product. The computer software product is stored in a storage medium. The storage medium includes a plurality of instructions to make a computer device (may be a personal computer, a server, or network equipment, etc.) implement the method according to each of the above embodiments.

The person having ordinary skills in the art can understand the modules of the above embodiments are distributed in the device according to the description of the embodiments. The modules of the above embodiments can also be changed to be located in one or multiple device of other different embodiments from the embodiment. The modules of the above embodiments can be combined into one module, or may be further split into a plurality of sub-modules.

In conclusion, the first to obtain the user's dynamic information about the contact person, and then the dynamic information about the contact person is displayed in the user's instant messaging chat window. Thus, after applying the embodiments, the information dynamically updated by the contact persons is displayed in the user's instant messaging chat window. When the user chats with the contact persons, the user can see the information dynamically updated by the contact persons timely in the chat interactive mode. Therefore, the user can obtain information and filter information more conveniently and with a shorter delay, thereby facilitating good communication between the user and the contact person and improving the user experience.

While the present disclosure has been described with reference to particular embodiments, it will be understood that the embodiments are illustrative and that the disclosure scope is not so limited. Alternative embodiments of the present disclosure will become apparent to those having ordinary skill in the art to which the present disclosure pertains. Such alternate embodiments are considered to be encompassed within the spirit and scope of the present disclosure. Accordingly, the scope of the present disclosure is described by the appended claims and is supported by the foregoing description.

What is claimed is:

1. A method for dynamically updating online activities associated with a first user on a terminal of a second user, wherein the first user and the second user are connected to each other via an instant messaging application hosted by a remote server, the method comprising:
   at the terminal of the second user having one or more processors and memory for storing instructions to be executed by the one or more processors:
      displaying a chat window of the instant messaging application, wherein the displayed chat window includes: (i) a chat entry area, (ii) an online activities count area, and (iii) an online activities summary area distinct from the online activities count area, the online activities count area and the online activities summary area being associated with the first user's account at a third-party application, the third-party application being different from the instant messaging application;
      receiving an online activities update message from the remote server;
      in response to receiving the online activities update message:
         extracting, from the online activities update message, a count of online activities associated with the first user and textual description of the online activities associated with the first user, wherein the online activates associated with the first user are initiated by the first user's account at the third-party application;
         generating a summary of the extracted textual description; and
         updating, within the instant messaging application:
            (i) the online activities count area of the chat window using the count of online activities associated with the first user, and
            (ii) the online activities summary area of the chat window by displaying the summary of the textual description of the online activities associated with the first user at the third-party application.

2. The method of claim 1, further comprising: when there is no online activity initiated by the first user since a last chat between the first user and the second user, updating only the online activities count area using a count of inbound online activities directed to the first user's account at the third-party application.

3. The method of claim 1, wherein the summary of the textual description of the online activities associated with the first user in the online activities summary area includes only a summary of the textual description of outbound online activities initiated by the first user's account at the third-party application.

4. The method of claim 1, wherein the online activities count area includes a count of both inbound and outbound online activities associated with the first user's account at the third-party application.

5. The method of claim 1, wherein the summary of the textual description of the online activities associated with the first user in the online activities summary area includes a summary of the textual description of both inbound and outbound online activities associated with the first user's account at the third-party application.

6. The method of claim 1, wherein the online activities count area includes a logo of the third-party application adjacent the count of online activities associated with the first user.

7. The method of claim 1, wherein the online activities include one or more of posting a blog on the first user's account at the third-party application, casting a vote through the first user's account at the third-party application, and uploading an image to the first user's account at the third-party application.

8. The method of claim 1, wherein the third-party application is one of a social networking website, an online blogger website, an online gaming website, and an online trading website.

9. A terminal used by a second user for communicating with a first user via an instant messaging application hosted by a remote server, the terminal comprising:
   one or more processors;
   memory; and
   a plurality of instructions stored in the memory and to be executed by the one or more processors, the plurality of instructions further including:
      displaying a chat window of the instant messaging application, wherein the displayed chat window includes: (i) a chat entry area, (ii) an online activities count area, and (iii) an online activities summary area distinct from the online activities count area, the online activities count area and the online activities summary area being associated with the first user's account at a third-party application, the third-party application being different from the instant messaging application;
      receiving an online activities update message from the remote server;
      in response to receiving the online activities update message:
         extracting, from the online activities update message, a count of online activities associated with the first user and textual description of the online activities associated with the first user, wherein the online activates associated with the first user are initiated by the first user's account at the third-party application;
         generating a summary of the extracted textual description; and
         updating, within the instant messaging application:
            (i) the online activities count area of the chat window using the count of online activities associated with the first user, and
            (ii) the online activities summary area of the chat window by displaying the summary of the textual description of the online activities associated with the first user at the third-party application.

10. The terminal of claim 9, wherein the plurality of instructions further comprises: when there is no online activity initiated by the first user since a last chat between the first user and the second user, updating only the online activities count area using a count of inbound online activities directed to the first user's account at the third-party application.

11. The terminal of claim 9, wherein the summary of the textual description of the online activities associated with the first user in the online activities summary area includes only a summary of the textual description of outbound online activities initiated by the first user's account at the third-party application.

12. The terminal of claim 9, wherein the online activities count area includes a count of both inbound and outbound online activities associated with the first user's account at the third-party application.

13. The terminal of claim 9, wherein the summary of the textual description of the online activities associated with the first user in the online activities summary area includes a summary of the textual description of both inbound and outbound online activities associated with the first user's account at the third-party application.

14. The terminal of claim 9, wherein the online activities count area includes a logo of the third-party application adjacent the count of online activities associated with the first user.

15. The terminal of claim 9, wherein the online activities include one or more of posting a blog on the first user's account at the third-party application, casting a vote through the first user's account at the third-party application, and uploading an image to the first user's account at the third-party application.

16. The terminal of claim 9, wherein the third-party application is one of a social networking website, an online blogger website, an online gaming website, and an online trading website.

* * * * *